United States Patent
Eluru et al.

(10) Patent No.: US 11,130,903 B2
(45) Date of Patent: *Sep. 28, 2021

(54) FULVIC ACID WELL TREATMENT FLUID

(71) Applicant: Halliburton Energy Services, Inc., Houston, TX (US)

(72) Inventors: Sairam Eluru, Pune (IN); Chetan Prakash, Pune (IN)

(73) Assignee: Halliburton Energy Services, Inc., Houston, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 16/499,765

(22) PCT Filed: May 9, 2017

(86) PCT No.: PCT/US2017/031746
§ 371 (c)(1),
(2) Date: Sep. 30, 2019

(87) PCT Pub. No.: WO2018/208288
PCT Pub. Date: Nov. 15, 2018

(65) Prior Publication Data
US 2020/0102487 A1    Apr. 2, 2020

(51) Int. Cl.
*C09K 8/528* (2006.01)
*C09K 8/68* (2006.01)
(Continued)

(52) U.S. Cl.
CPC ............... *C09K 8/528* (2013.01); *C09K 8/68* (2013.01); *C09K 8/72* (2013.01); *C09K 8/86* (2013.01)

(58) Field of Classification Search
CPC . C09K 8/528; C09K 8/68; C09K 8/72; C09K 8/86
See application file for complete search history.

(56) References Cited

U.S. PATENT DOCUMENTS

| | | |
|---|---|---|
| 2,076,489 A | 4/1937 | Williams |
| 2,076,490 A | 4/1937 | Williams |
| (Continued) | | |

FOREIGN PATENT DOCUMENTS

| | | |
|---|---|---|
| WO | 2016053288 A1 | 7/2016 |
| WO | 2017066585 | 4/2017 |

OTHER PUBLICATIONS

International Search Report issued in PCT Application No. PCT/US2017/031746, dated Sep. 14, 2018.
(Continued)

*Primary Examiner* — Frances Tischler
(74) *Attorney, Agent, or Firm* — McAfee & Taft

(57) ABSTRACT

A method of treating a well comprising introducing an aqueous-based well treatment fluid into the well and treating the well with the well treatment fluid is provided. The well treatment fluid comprises an aqueous base fluid, and a treating agent. The treating agent comprises fulvic acid. In one embodiment, the treating agent functions as a scale inhibitor. In another embodiment, the treating agent functions as a gel stabilizer. For example, the method can be a method of fracturing a subterranean formation. For example, the method can be a method of forming a gravel pack in a well. An aqueous-based well treatment fluid is also provided.

21 Claims, 3 Drawing Sheets

(51) Int. Cl.
*C09K 8/72* (2006.01)
*C09K 8/86* (2006.01)

(56) References Cited

U.S. PATENT DOCUMENTS

| | | |
|---|---|---|
| 2,905,251 A | 9/1959 | Church |
| 4,945,991 A | 8/1990 | Jones |
| 6,436,880 B1 | 8/2002 | Frenier |
| 7,565,929 B2 | 7/2009 | Bustos et al. |
| 10,464,831 B1 | 11/2019 | Bader |
| 2002/0169081 A1 | 11/2002 | Krosigk |
| 2005/0069974 A1* | 3/2005 | Gladkov ............... C05F 11/02 435/41 |
| 2005/0261138 A1 | 11/2005 | Robb et al. |
| 2007/0007004 A1 | 1/2007 | Castellano |
| 2008/0078545 A1 | 4/2008 | Welton et al. |
| 2009/0143258 A1 | 6/2009 | Welton et al. |
| 2010/0314109 A1 | 12/2010 | Garcia et al. |
| 2011/0240131 A1 | 10/2011 | Parker |
| 2015/0252253 A1 | 9/2015 | Soane et al. |
| 2016/0102237 A1 | 4/2016 | Pober et al. |
| 2016/0333669 A1 | 11/2016 | Mello et al. |

OTHER PUBLICATIONS

Written Opinion issued in PCT Application No. PCT/US2017/031746, dated Sep. 14, 2018.

* cited by examiner

FULVIC ACID WELL TREATMENT FLUID

BACKGROUND

Aqueous-based well treatment fluids are used in a variety of applications in the oil and gas field. Examples of aqueous-based well treatment fluids include aqueous-based drilling fluids, stimulation fluids (including acidizing and fracturing fluids), completion fluids (including gravel packing fluids) and workover fluids. The particular components of aqueous-based well treatment fluids vary greatly depending on the type of fluid and the particular application.

A component often used in aqueous-based well treatment fluids is a scale inhibitor. For example, scale inhibitors are often added to aqueous-based well treatment fluids to inhibit the formation of scale (for example, mineral deposits) on surfaces of the wellbore, formations penetrated by the wellbore and equipment used in association with the well, including, but not limited to, surfaces of formation rock, formation fractures, proppant packs formed in the well, wellbore perforations, casing, work strings, production tubing, valves and pumps. Scale buildup on such surfaces can block or hinder fluid flow and even reduce production during the production phase of the well.

Another type of component often used in well treatment fluids is a polymer gelling agent. For example, polymer gelling agents are often added to aqueous-based well treatment fluids to increase the viscosity and otherwise modify the rheology of the fluids without changing other properties of the fluids. Most polymer gelling agents can be crosslinked to further increase the viscosity of the well treatment fluids. It is generally important for a gelled well treatment fluid to maintain its viscosity until the desired treatment has been completed. Once the desired treatment has been completed, the gel formed by the gelling agent can be allowed or caused to break in order to reduce the viscosity of the fluid and allow the fluid to be more easily removed from the well.

Unfortunately, polymer gels in aqueous-based well treatment fluids often become unstable and degrade when the temperature in the well reaches a certain level (for example, when the temperature in the well rises to 200° F. and higher). For example, at temperatures of 200° F. and higher, oxygen can begin to release oxygen radicals which can result in degradation of the polymer gelling agent. As a result, gel stabilizers are often added to aqueous-based well treatment fluids that comprise polymer gelling agents in order to increase the stability of the gels at higher temperatures.

In drilling a well, an aqueous-based drilling fluid (for example, an aqueous-based drilling mud) is typically circulated from the surface through the drill string and drill bit and back to the surface through the annulus between the drill string and the borehole wall. The drilling fluid functions, for example, to cool, lubricate and support the drill bit, remove cuttings from the wellbore, control formation pressures, and maintain the stability of the wellbore.

For example, scale inhibitors are added to aqueous-based drilling fluids to prevent the formation of scale in the drill string and drilling equipment. For example, polymer gelling agents are added to aqueous-based drilling fluids to increase the viscosity of the fluids. The increased viscosity of the fluids helps suspend and prevent settling of weighting agents, drill cuttings and other components therein.

In a hydraulic fracturing operation, an aqueous-based fracturing fluid is pumped into a subterranean formation at a pressure sufficient to initiate or extend one or more fractures in the formation. Proppant particulates are placed in the fracture(s) to hold the fracture(s) open once the hydraulic pressure on the formation is released. The resulting propped fracture provides one or more conductive channels through which fluids in the formation can flow from the formation to the wellbore.

For example, scale inhibitors are added to aqueous-based fracturing fluids to place the scale inhibitor in the reservoir matrix for subsequently mixing with produced fluids. The objective, for example, is for water moving through the reservoir toward the wellbore to dissolve a sufficient amount of the scale inhibitor to inhibit scale formation in the production tubing. For example, polymer gelling agents are added to aqueous-based fracturing fluids to increase the viscosity thereof. The increased viscosity of the fracturing fluids makes it easier to fracture the formation and helps suspend and prevent settling of proppant particulates in the fracturing fluid.

In a gravel pack operation, a gravel pack is installed proximate to an unconsolidated or loosely consolidated production interval to mitigate the production of relatively fine particulate materials (such as sand) during the production phase. For example, if not controlled, produced sand or other particulate material can cause abrasive wear to components within the well. In addition, the particulate material can clog the well, creating the need for an expensive workover. Also, if the particulate material is produced to the surface, it has to be removed from the produced hydrocarbon fluids.

In a typical gravel pack operation, a sand control screen is lowered into the wellbore on a work string to a desired position proximate to the production interval at issue. An aqueous-based gravel packing fluid containing a base liquid and a relatively large particulate material known in the art as gravel (for example, large grain sand) is then pumped down the work string to place gravel into the annulus between the sand control screen and the formation or casing to inhibit the flow of particulates from a portion of the formation to the wellbore. The base liquid of the gravel packing fluid either flows into the formation or returns to the surface by flowing through the sand control screen or both. In either case, the gravel is deposited concentrically around the sand control screen to form a gravel pack, which is highly permeable to the flow of hydrocarbon fluids yet blocks the flow of the particulate material carried by the hydrocarbon fluids. As a result, gravel packs can successfully prevent the problems associated with the production of sand and other particulate material from the formation.

For example, scale inhibitors are often added to aqueous-based gravel packing fluids to keep the sand control screen from becoming clogged due to the formation of scale thereon and to place the scale inhibitor in the reservoir matrix to cause it to be subsequently mixed with produced fluids. For example, gravel packing fluids can contain heavy brines that can contribute to scale formation. For example, polymer gelling agents are added to aqueous-based gravel packing fluids in order to increase the viscosity of the fluids. The increased viscosity of the gravel packing fluids helps suspend and prevent settling of the gravel in the fluid.

In view of the common use of scale inhibitors and gel stabilizers in aqueous-based well treatment fluids, there is a need for new scale inhibitors and gel stabilizers that have enhanced properties.

BRIEF DESCRIPTION OF THE DRAWINGS

The drawings included with this application illustrate certain aspects of the embodiments described herein. However, the drawings should not be viewed as exclusive embodiments. The subject matter disclosed herein is capable of considerable modifications, alterations, combinations, and equivalents in form and function, as will be evident to those skilled in the art with the benefit of this disclosure.

DETAILED DESCRIPTION

Figure 1:
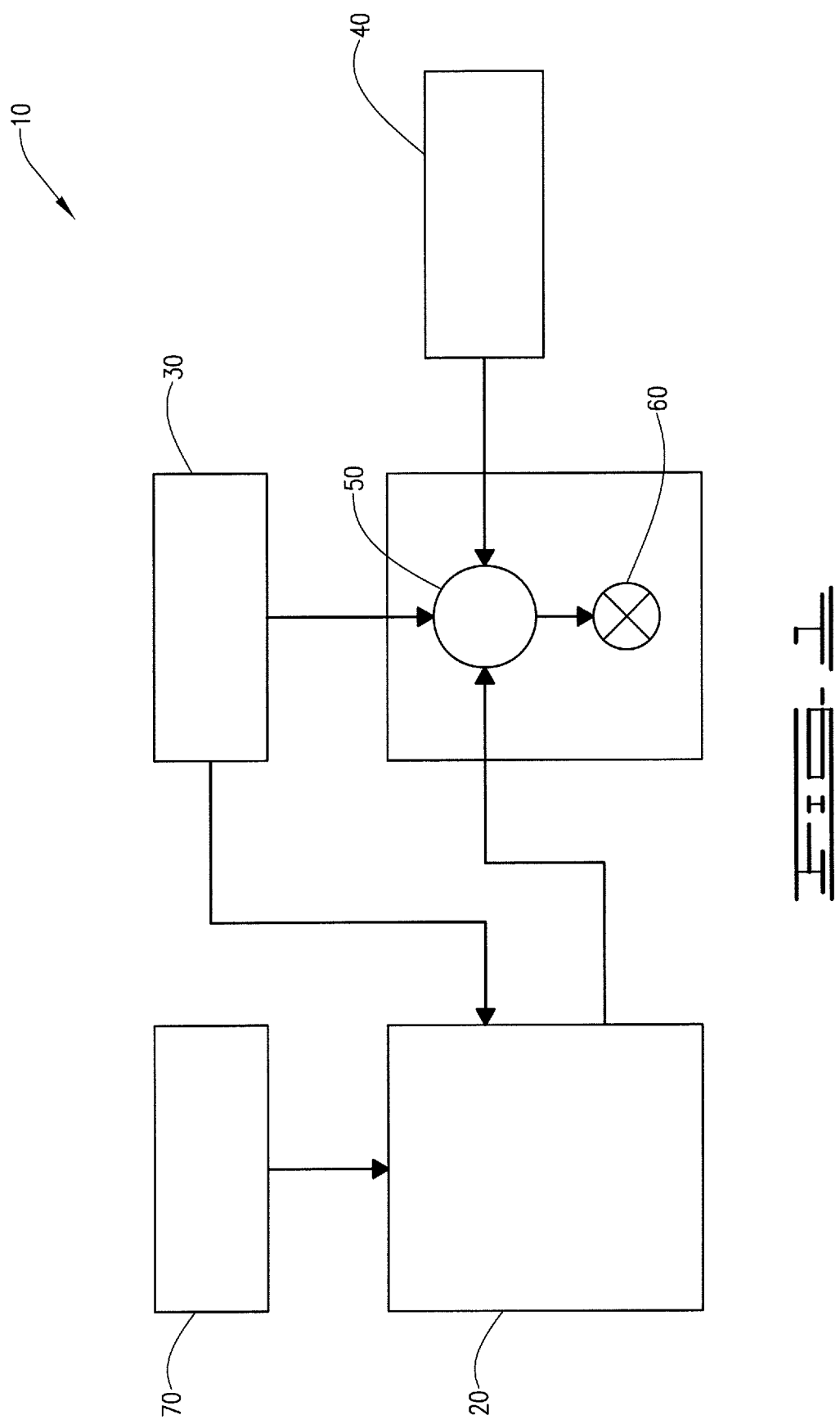
FIG. 1 is a diagram illustrating an example of a fracturing system that can be used in accordance with certain embodiments of the present disclosure.

The present disclosure may be understood more readily by reference to this detailed description as well as to the examples included herein. For simplicity and clarity of illustration, where appropriate, reference numerals may be repeated among the different figures to indicate corresponding or analogous elements. In addition, numerous specific details are set forth in order to provide a thorough understanding of the examples described herein. However, it will be understood by those of ordinary skill in the art that the examples described herein can be practiced without these specific details. In other instances, methods, procedures and components have not been described in detail so as not to obscure the related relevant feature being described. Also, the description is not to be considered as limiting the scope of the examples described herein. The drawings are not necessarily to scale and the proportions of certain parts have been exaggerated to better illustrate details and features of the present disclosure.

In one aspect, the present disclosure provides a method of treating a well. In another aspect, the present disclosure provides an aqueous-based well treatment fluid. Unless stated otherwise, as used herein and in the appended claims, a "well" means a wellbore extending into the ground and a subterranean formation penetrated by the wellbore. For example, a well can be an oil well, a natural gas well, a water well or any combination thereof. A "well treatment fluid" means any fluid that is introduced into a well to treat the well or the subterranean formation.

Method of Treating a Well

The method of treating a well disclosed herein comprises introducing an aqueous-based well treatment fluid into the well and treating the well with the well treatment fluid. The well treatment fluid includes an aqueous base fluid and a treating agent. For example, the well treatment fluid can be an aqueous-based injection fluid, an aqueous-based drilling mud or other drilling fluid, an aqueous-based pre-flush fluid, an aqueous-based cement composition, an aqueous-based fracturing, acidizing or other stimulation fluid, an aqueous-based gravel packing fluid or other completion fluid, or an aqueous-based workover fluid. For example, the well treatment fluid can be an aqueous-based hydraulic fracturing fluid. For example, the well treatment fluid can be an aqueous-based gravel packing fluid.

For example, the aqueous base fluid of the well treatment fluid disclosed herein can comprise fresh water, salt water, or brine (for example, saturated saltwater or produced water). For example, seawater, brackish water, produced water (for example, water produced from a subterranean formation), formation water, treated flowback water, and any combination thereof can be used. For example, the aqueous base fluid can comprise fresh water. For example, the aqueous base fluid can comprise salt water. For example, the aqueous base fluid can comprise brine.

The treating agent of the well treatment fluid used in the method disclosed herein comprises fulvic acid. For example, the treating agent of the well treatment fluid used in the method disclosed herein can consist of fulvic acid. In addition to the treating agent disclosed herein, the well treatment fluid can also include other agents and components as well.

Fulvic acid is completely soluble in water at all pH conditions. It is a very good free radical scavenger and anti-oxidant. It is a natural component that is environmentally friendly (that is, that does not harm the environment). Fulvic acid is used in food grade materials. A representative structural formula of fulvic acid is shown by formula (1) set forth below:

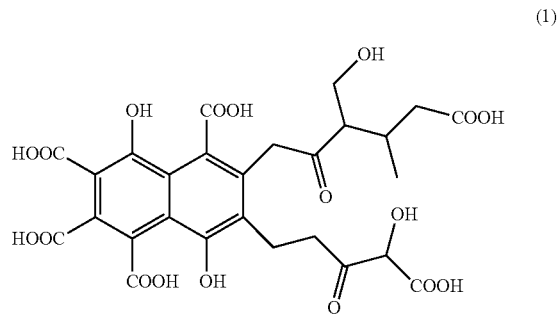 [SMILES: CC(CC(=O)O)C(CO)C(=O)Cc1c(CCC(=O)C(O)C(=O)O)c(O)c2c(C(=O)O)c(C(=O)O)c(C(=O)O)c(O)c2c1C(=O)O]

(1)

For example, the treating agent can be present in the well treatment fluid used in the method disclosed herein in an amount in the range of from about 0.1 pound per 1000 gallons to about 1000 pounds per 1000 gallons of the aqueous base fluid. For example, the treating agent can be present in the well treatment fluid used in the method disclosed herein in an amount in the range of from about 1 pound per 1000 gallons to about 250 pounds per 1000 gallons of the aqueous base fluid. For example, the treating agent can be present in the well treatment fluid used in the method disclosed herein in an amount in the range of from about 10 pounds per 1000 gallons to about 100 pounds per 1000 gallons of the aqueous base fluid. The specific amount of the treating agent present in the well treatment fluid can vary depending on the purpose(s) of the treating agent, the particular application(s) of the method and the conditions of the well.

For example, in one embodiment of the method disclosed herein, the treating agent functions as a scale inhibitor and is present in the well treatment fluid in an amount sufficient to inhibit the formation of scale on at least one surface associated with the well. As used herein and in the appended claims, a "scale inhibitor" means a chemical compound that is used to inhibit the deposition of scale on at least one surface associated with the well. The term "scale" means mineral deposits that precipitate out of reservoir water, other aqueous fluids, or mixtures thereof. For example, mineral inorganic scales can be inhibited by the treating agent used in the method disclosed herein. Examples of such scales include calcite, barite, chlorite, celestite, anhydrite, gypsum, carbonates such as calcium carbonate, sulfides such as iron sulfide, and sulfates such as barium sulfate and strontium sulfate. For example, anions of carbonates, sulfates, sulfides and other compounds can form scales with cations of calcium, sodium, magnesium, barium, iron, strontium, zinc and other metals.

As used herein and in the appended claims, the phrase "to inhibit the deposition of scale" means to control, minimize or prevent the deposition of scale. A "surface associated with the well" means a surface associated with the wellbore, a formation penetrated by the wellbore, or equipment used in association with the well. Examples of such surfaces include surfaces of formation rock, formation fractures (natural or induced), proppant packs formed in the well, perforations and other access conduits, casing, work strings, production tubing, valves pumps and other surface and downhole equipment associated with the well. For example, the treating agent of the method disclosed herein can bind ions in the aqueous phase of production fluids to keep the corresponding salts from precipitating out of the fluids and otherwise serve as an effective oil and gas field scale inhibitor.

For example, when used as a scale inhibitor, the treating agent can be present in the well treatment fluid used in the method disclosed herein in an amount in the range of from about 0.1 pound per 1000 gallons to about 1000 pounds per 1000 gallons of the aqueous base fluid. For example, when used as a scale inhibitor, the treating agent can be present in the well treatment fluid used in the method disclosed herein in an amount in the range of from about 10 pounds per 1000 gallons to about 100 pounds per 1000 gallons of the aqueous base fluid. For example, when used as a scale inhibitor, the treating agent can be present in the well treatment fluid used in the method disclosed herein in an amount in the range of from about 20 pounds per 1000 gallons to about 80 pounds per 1000 gallons of the aqueous base fluid.

For example, in another embodiment of the method disclosed herein, the well treatment fluid further comprises a polymer gelling agent present in the well treatment fluid in an amount sufficient to form a gel and increase the viscosity of the well treatment fluid. The polymer gelling agent is hydrated by the aqueous base fluid and forms a gel, which in turn increases the viscosity of the base fluid. For example, in this embodiment, the treating agent functions as a gel stabilizer and is present in the well treatment fluid in an amount sufficient to stabilize the gel. For example, in this embodiment, the treating agent can also function as a scale inhibitor and be present in the well treatment fluid in an amount sufficient to both inhibit the formation of scale on at least one surface associated with the well and stabilize the gel.

For example, when used as a gel stabilizer, the treating agent can be present in the well treatment fluid used in the method disclosed herein in an amount in the range of from about 0.1 pound per 1000 gallons to about 1000 pounds per 1000 gallons of the aqueous base fluid. For example, when used as a gel stabilizer, the treating agent can be present in the well treatment fluid used in the method disclosed herein in an amount in the range of from about 10 pounds per 1000 gallons to about 100 pounds per 1000 gallons of the aqueous base fluid. For example, when used as a gel stabilizer, the treating agent can be present in the well treatment fluid used in the method disclosed herein in an amount in the range of from about 20 pounds per 1000 gallons to about 80 pounds per 1000 gallons of the aqueous base fluid.

For example, when used as both a scale inhibitor and a gel stabilizer, the treating agent can be present in an amount in the range of from about 0.1 pound per 1000 gallons to about 1000 pounds per 1000 gallon of the aqueous base fluid. For example, when used as both a scale inhibitor and a gel stabilizer, the treating agent can be present in the well treatment fluid used in the method disclosed herein in an amount in the range of from about 1 pound per 1000 gallons to about 300 pounds per 1000 gallons of the aqueous base fluid.

As used herein and in the appended claims, a gel stabilizer means a compound that stabilizes a gel formed by a gelling agent in a well treatment fluid. A "gel" means a semi-rigid (gelatinous) colloidal dispersion of a solid within an aqueous base fluid. For example, the treating agent disclosed herein acts as a scavenger of oxygen radicals generated by oxygen at high temperatures (for example, temperatures of 200° F. and higher) and prevents the oxygen radicals from causing damage to or breaking the polymer backbone of the polymer gelling agent. By keeping the oxygen radicals from causing damage to or breaking the polymer backbone of the polymer gelling agent, the treating agent helps maintain the viscosity, elasticity and other important rheological properties of the gelled well treatment fluid thereby increasing the temperature limit of the gelled well treatment fluid. For example, the treating agent disclosed herein can increase the temperature limit at which a gel formed using a diutan gelling agent begins to degrade from around 275° F. to about 310° F. Gels formed with the treating agent have very good thermal stability even in high density brines. For example, gelled fracturing fluids and gravel packing fluids are stable for at least one hour at 310° F. The viscosity of gels stabilized with the treating agent is not significantly increased which means increased pumping pressures to inject the well treatment fluid into the wellbore and into the formation are not required.

As used herein and in the appended claims, a "polymer gelling agent" means a polymer that forms a gel when combined with an aqueous base fluid. Examples of polymer gelling agents that can be used include polysaccharides such as galactomannan gums, polyacrylamide and other acrylamide-based gelling agents, guar and guar derivatives, including hydroxypropyl guar, carboxymethyl guar and carboxymethyl hydroxypropyl guar, cellulose and cellulose derivatives, xanthan, diutan, hydroxypropyl cellulose phosphate, hydroxypropyl starch phosphate and synthetic polymer gelling agents and combinations thereof.

For example, the gelling agent of the well treatment fluid used in the method disclosed herein can comprise diutan gum. Diutan gum is a polysaccharide designated S-657, which is prepared by fermentation of a strain of *sphingomonas*. Its structure has been elucidated as a hexasaccharide having a tetrasaccharide repeating unit in the backbone that comprises glucose and rhamnose units and di-rhamnose side chains. It is believed to have thickening, suspending, and stabilizing properties in aqueous solutions. Polysaccharide S-657 is composed principally of carbohydrates, about 12% protein, and about 7% (calculated as 0-acetyl) acyl groups, the carbohydrate portion containing about 19% glucuronic acid, and the neutral sugars rhamnose and glucose in the approximate molar ratio of about 2:1. For example, a suitable diutan gum gelling agent is available from Halliburton Energy Services, Inc. in association with the trade name WG-38™ gelling agent.

The amount of the gelling agent present in the well treatment fluid used in the method disclosed herein can vary depending on the additional components of the well treatment fluid and the particular application. For example, the gelling agent is generally present in the well treatment fluid in an amount in the range of from about 1 pound per 1000 gallons to about 500 pounds per 1000 gallons of the aqueous base fluid. For example, the gelling agent is generally present in the well treatment fluid in an amount in the range of from about 10 pounds per 1000 gallons to about 200 pounds per 1000 gallons of the aqueous base fluid. For example, the gelling agent is generally present in the well treatment fluid in an amount in the range of from about 25 pounds per 1000 gallons to about 100 pounds per 1000 gallons of the aqueous base fluid.

The gelled well treatment fluids disclosed herein may vary widely in density. One of ordinary skill in the art with the benefit of this disclosure will recognize the particular density that is most appropriate for a particular application. The desired density for a particular gelled well treatment fluid may depend on characteristics of the well, including the hydrostatic pressure required to control the fluids of the subterranean formation during placement of the gelled well treatment fluids, and the hydrostatic pressure which will damage the subterranean formation.

For example, the well treatment fluid used in the method disclosed herein can further comprise a gel crosslinker to crosslink the gelling agent of the well treatment fluid and thereby further increase the viscosity of the well treatment fluid. Examples of gel crosslinkers that can be used include boric acid, disodium octaborate tetrahydrate, sodium diborate, pentaborates, ulexite and colemanite, compounds that can supply zirconium IV ions (such as, for example, zirconium lactate, zirconium acetate lactate, zirconium lactate triethanolamine, zirconium carbonate, zirconium acetylacetonate, zirconium malate, zirconium citrate, and zirconium diisopropylamine lactate), compounds that can supply titanium IV ions (such as, for example, titanium lactate, titanium malate, titanium citrate, titanium ammonium lactate, titanium triethanolamine, and titanium acetylacetonate), aluminum compounds including, for example, aluminum lactate and aluminum citrate, antimony compounds, chromium compounds, iron compounds, copper compounds, zinc compounds, and any combination thereof. For example, the above crosslinkers are particularly suitable for use in connection with guar and its derivatives and polyacrylamide-based gelling agents. Brines and compounds generating calcium ions, magnesium ions or polyvalent ions can also function as gel crosslinkers to crosslink the gelling agent of the well treatment fluid disclosed herein. For example, it can be beneficial to crosslink the gel when the well treatment fluid is a fracturing fluid.

The amount of the gel crosslinker added to the well treatment fluid can vary depending on the amount of the gelling agent present in the well treatment fluid, the well conditions, the particular application and other factors known to those skilled in the art with the benefit of this disclosure. For example, the gel crosslinker can be included in the well treatment fluid in an amount in the range of from about 0.0001 pound per 1000 gallons to about 100 pounds per 1000 gallons of the aqueous base fluid. For example, the gel crosslinker can be included in the well treatment fluid in an amount in the range of from about 0.001 pound per 1000 gallons to about 100 pounds per 1000 gallons of the aqueous base fluid. For example, the gel crosslinker can be included in the well treatment fluid in an amount in the range of from about 0.01 pound per 1000 gallons to about 20 pounds per 1000 gallons of the aqueous base fluid.

For example, the well treatment fluid disclosed herein can further comprise a gel breaker to break the gel formed in the well treatment fluid (including crosslinked gels). The gel breaker can be any gel breaker known to those skilled in the art with the benefit of this disclosure to break a gel or crosslinked gel formed with a polymer gelling agent and thereby decrease the viscosity of the well treatment fluid.

Any suitable gel breaker can be used, including encapsulated gel breakers and internal delayed gel breakers, such as enzyme, oxidizing, acid buffer, or temperature-activated gel breakers. Multiple gel breakers can be used. The gel breaker causes the viscous well treatment fluid to revert to a lower viscosity fluid that allows particulates that are still suspended by the well treatment fluid to fall out of the fluid and allows the fluid to be more easily removed from the well (for example, produced back to the surface) after the treatment is complete. For example, the gel breaker can be selected from the group of oxidizers, acids, acid releasing agents, enzymes, and any combination thereof. Examples of suitable gel breakers include persulfates, chlorates, chlorites, organic acids such as acetic acid, mineral acids and peroxides. For example, the same gel breaker can be used for both cross-linked and non-crosslinked gels. For example, peroxide gel breakers can be particularly useful in connection with breaking gels formed using diutan gum gelling agents. Another gel breaker that can be particularly useful in connection with breaking gels formed using diutan gum gelling agents is a breaker that includes acetic acid and acetic acid anhydrate and is supplied by Halliburton Energy Services in connection with the trade designation AQLB-2™.

The amount of the gel breaker added to the well treatment fluid can vary depending on the amount of the gelling agent present in the well treatment fluid, whether or not the gel is crosslinked, well conditions, the particular application, the amount of time required for the gel breaker to break the gel and other factors known to those skilled in the art with the benefit of this disclosure. For example, the amount of the gel breaker added to the well treatment fluid can be optimized to break the gel after a desired period of time. For example, the gel breaker is present in the well treatment fluid in an amount in the range of from about 0.00001% by weight to about 30% by weight, based on the amount of the gelled fluid present in the well treatment fluid. For example, the gel breaker is present in the well treatment fluid in an amount in the range of from about 0.001% by weight to about 10% by weight, based on the amount of gelled fluid present in the well treatment fluid. For example, the gel breaker is present in the well treatment fluid in an amount in the range of from about 0.1% by weight to about 2% by weight, based on the amount of gelled fluid present in the well treatment fluid.

Additional components that can be included in the well treatment fluid used in the method disclosed herein include friction reducing agents, clay control agents, buffers and other pH control agents, biocides, bactericides, additional scale inhibitors, weighting materials, fluid loss control additives, bridging materials, corrosion inhibitors, non-emulsifiers, additional surfactants, proppant particulates (including conventional or primary proppant particulates and micro-proppant particulates), and gravel for forming gravel packs. As will be understood by those skilled in the art with the benefit of this disclosure, the additional components and the amounts thereof that are utilized will vary depending on the particular application in which the well treatment fluid is used.

Examples of friction reducing agents that can be used include polysaccharides, polyacrylamides and combinations thereof. The polymer gelling agent of the well treatment fluid can also function to reduce friction in some cases.

Examples of clay control agents that can be included in the well treatment fluid include salts such as potassium chloride, sodium chloride, ammonium chloride, choline chloride, di-quaternary polymers and polyquaternary polymers.

Examples of buffers and other pH control agents that can be included in the well treatment fluid include sodium hydroxide, potassium hydroxide, sodium carbonate, sodium bicarbonate, potassium carbonate, potassium bicarbonate, acetic acid, sodium acetate, sulfamic acid, hydrochloric acid, formic acid, citric acid, phosphonic acid, polymeric acids and combinations thereof. For example, a pH control agent can be used to maintain the pH of the well treatment fluid at a desired level, for example, to facilitate dispersion of a gelling agent into the well treatment fluid. For example, the pH of the well treatment fluid can be adjusted to activate or deactivate a crosslinking agent or to activate a breaker.

Examples of biocides and bactericides that can be included in the well treatment fluid disclosed herein include 2,2-dibromo-3-nitrilopropionamide, 2-bromo-2-nitro-1,3-propanediol, sodium hypochlorite, and combinations thereof. For example, biocides and bactericides may be included in the fracturing fluid in an amount in the range of from about 0.001% to about 0.1% by weight, based on the weight of the aqueous base fluid.

Examples of additional scale inhibitors that can be included in the well treatment fluid include bis(hexamethylene triamine penta(methylene phosphonic acid)), diethylene triamine penta(methylene phosphonic acid), ethylene diamine tetra(methylene phosphonic acid), hexamethylenediamine tetra(methylene phosphonic acid), 1-hydroxyethylidene-1,1-diphosphonic acid, 2-hydroxyphosphonocarboxylic acid, 2-phosphonobutane-1,2,4-tricarboxylic acid, phosphino carboxylic acid, diglycol amine phosphonate, aminotris(methanephosphonic acid), methylene phosphonate, phosphonic acid, aminoalkylene phosphonic acid, aminoalkyl phosphonic acid, polyphosphate, salts of polyphosphate, and combinations thereof. For example, the scale inhibitors can be included in the fracturing fluid in an amount in the range of from about 0.001% to about 0.1% by weight, based on the weight of the aqueous base fluid.

Examples of weighting materials that can be included in the well treatment fluid include brines and other salts, barite, ferrite, and hematite. For example, barite is commonly used as a weighting material.

Examples of fluid loss control agents and bridging materials that can be included in the well treatment fluid include metal carbonates such as calcium carbonate and magnesium carbonate, polylactic acid, polyvinyl alcohol, chitosan and derivatives thereof, hydroxyethyl cellulose, derivatives of acrylamides, clays and other layered materials, and other suitable degradable particles.

Examples of corrosion inhibitors that can be included in the well treatment fluid include quaternary ammonium compounds such as polyquaternary ammonium, unsaturated carbonyl compounds, unsaturated ether compounds, cinnamaldehyde, caffeine, alkaloids and other corrosion inhibitors known to be useful in connection with drilling fluid and fracturing fluids by those skilled in the art with the benefit of this disclosure.

Examples of non-emulsifiers that can be included in the well treatment fluid include cationic, non-ionic, anionic, and zwitterionic non-emulsifiers. Specific examples of non-emulsifiers that can be used include a combination of terpene and an ethoxylated alcohol, ethoxylated nonylphenols, octylphenol polyethoxyethanol, potassium myristate, potassium stearylsulfate, sodium lauryl sulfonate, polyoxyethylene alkyl phenol, polyoxyethylene, polyoxyethylene (20 mole) stearyl ether, N-cetyl-N-ethyl morpholinium ethosulfate, and combinations thereof. For example, a non-emulsifier can be included in the well treatment fluid in an amount in the range of from about 0.001% to about 5% by weight, based on the weight of the aqueous base fluid.

Additional surfactants that can be included in the well treatment fluid include surfactants useful to improve the compatibility of the well treatment fluid with formation and other fluids that may be present in the well. An artisan of ordinary skill with the benefit of this disclosure will be able to identify the types of additional surfactants as well as the appropriate concentrations thereof to be used.

Examples of primary proppant particulates that can be included in the well treatment fluid include the types of proppant particulates included in fracturing fluids, as discussed below.

Examples of micro-proppant particulates that can be included in the well treatment fluid disclosed herein include the types of micro-proppant particulates included in fracturing fluids, as discussed below.

Examples of gravel that can be included in the well treatment fluid disclosed herein include the types of gravel included in gravel packing fluids, as discussed below.

For example, the well treatment fluid disclosed herein can be introduced into the well and the well can be treated with the well treatment fluid in accordance with the method disclosed herein by pumping the well treatment fluid into the well under a sufficient hydraulic pressure and for a sufficient time to allow the well treatment fluid to treat the well. The well treatment fluid can be pumped into the well using one or more pumps present on the well site as known to those skilled in the art with the benefit of this disclosure. For example, if necessary, pumping can be stopped and the well can be shut in for an amount of time necessary to allow well treatment fluid to treat the well.

The components of the well treatment fluid can be mixed together in any manner known to those skilled in the art with the benefit of this disclosure. For example, components can be mixed together using mixing equipment present on the well site. For example, components can be added to the well treatment fluid on the fly as the well treatment fluid is pumped into the wellbore.

If the well treatment fluid used in the method comprises a polymer gelling agent present in an amount sufficient to form a gel and increase the viscosity of the well treatment fluid, a gel can be allowed to form in the well treatment fluid by mixing the aqueous base fluid, treating agent, polymer gelling agent, gel stabilizer (if used), gel crosslinker (if used), and gel breaker (if used) of the well treatment fluid together. For example, the components of the well treatment fluid can be mixed together in a blender located on the site of the well. For example, the polymer gelling agent can be in the form of a dry powder or a liquid gel concentrate. When the polymer gelling agent is mixed with the aqueous base fluid, a gel is formed.

Although the gelled well treatment fluids disclosed herein are effective for use in wellbores and subterranean formations having low temperatures, they are particularly suitable for use in wellbores and subterranean formations having high temperatures. For example, one or both of the wellbore and the subterranean formation can have a temperature greater than or equal to 200° F. For example, one or both of the wellbore and the subterranean formation can have a temperature greater than or equal to 275° F.

If the well treatment fluid used in the method comprises a polymer gelling agent present in an amount sufficient to form a gel and increase the viscosity of the well treatment fluid, the method disclosed herein can further comprise breaking the gel. As used herein and in the appended claims, "breaking the gel" means allowing the gel formed in the well treatment fluid to break or causing the gel formed in the well treatment fluid to break.

For example, the gel formed in the well treatment fluid can be allowed to break on its own (without a gel breaker) due to the temperature or pH in the well or due to the elapse of time. For example, in some cases, exposure of the well treatment fluid to downhole temperatures can be sufficient to cause the gel to break. For example, the gel formed in the well treatment fluid can be caused to break by exposing the well treatment fluid to a gel breaker. For example, a gel breaker can be used to accelerate the gel breaking process initiated by the temperature in the wellbore.

Depending on the nature of the gel breaker, the gel breaker can be included in the initial well treatment fluid first introduced into the well or can be added to the well treatment fluid after the well treatment fluid is first introduced into the well. For example, gel breakers that are encapsulated or internal delayed can be mixed with the initial well treatment fluid first introduced into the well. The same gel breaker can work for both crosslinked and non-crosslinked gels.

Whether the gel is allowed to break or caused to break will vary depending on the amount of the polymer gelling agent used in the well treatment fluid, whether the polymer gelling agent is crosslinked, the well conditions, the particular application and other factors known to those skilled in the art with the benefit of this disclosure.

The method can further comprise removing the broken gel from the well. For example, the broken gel can be removed from the well by circulating an inert fluid through the wellbore to flush the well, by flowing back the well, or by other techniques known to those skilled in the art with the benefit of this disclosure.

In one embodiment, the method disclosed herein is a method of drilling a well. In this embodiment, the well treatment fluid is an aqueous-based drilling fluid. The method comprises circulating an aqueous-based drilling fluid (for example, an aqueous-based drilling mud) through the wellbore. For example, the drilling fluid can be circulated from the surface through the drill string and drill bit and back to the surface through the annulus between the drill string and the borehole wall. The drilling fluid functions, for example, to cool, lubricate and support the drill bit, remove cuttings from the wellbore, control formation pressures, and maintain the stability of the wellbore. For example, in this embodiment, the treating agent can function to prevent the formation of scale on surfaces of surface equipment, the drill string and other equipment used in association with drilling the well.

In one embodiment, the method disclosed herein is a method of fracturing a subterranean formation. In this embodiment, the well treatment fluid is a fracturing fluid and further comprises a plurality of proppant particulates. The method comprises: providing the fracturing fluid; pumping the fracturing fluid through the wellbore into the formation at a pressure above the fracture gradient of the formation to form a fracture in the formation; placing proppant particulates in the fracture; and ceasing pumping of the fracturing fluid into the formation.

As used herein and in the appended claims, the term "fracturing fluid" means a pad fracturing fluid, a proppant slurry or any other type of treatment fluid that is pumped into the subterranean formation at a pressure above the fracture gradient of the formation during a hydraulic formation fracturing operation. The term "pad fracturing fluid" means a fracturing fluid that does not include primary proppant particulates. A pad fracturing fluid is typically used to initiate the fracture or fracture network and is injected into the formation in multiple stages. The term "proppant slurry" means a fracturing fluid that does include primary proppant particulates. A proppant slurry is typically used after a fracture or fracture network is initiated in the formation and is injected into the formation in multiple stages. A "propped fracture" means a fracture (naturally-occurring or otherwise) in a subterranean formation that contains a plurality of micro-proppant particulates or primary proppant particulates.

The fracturing fluid can be provided, for example, by mixing the components of the fracturing fluid together at the site of the well as known to those skilled in the art with the benefit of this disclosure. For example, the proppant particulates can be included in the fracturing fluid in an amount at least sufficient to place proppant particulates in the fracture.

The fracturing fluid can be pumped through the wellbore into the formation at a pressure above the fracture gradient of the formation to form a fracture in the formation in any manner known to those skilled in the art with the benefit of this disclosure. As used herein and in the appended claims, the "fracture gradient" of a formation means the minimum pressure required to create a new fracture or expand an existing fracture in some dimension in the formation. "Fracturing the formation" means forming a new fracture or expanding an existing fracture in some dimension in the formation.

In carrying out the above method, the fracturing fluid is pumped through the wellbore and through one or more access conduits into the formation. As used herein and in the appended claims, the term "access conduit" refers to a passageway that provides fluid communication between the wellbore and the formation. Examples of access conduits include sliding sleeves, open holes, hydra-jetted holes and perforations. Access conduits can be formed in non-cased (open) areas and cased areas of the wellbore. The access conduits can extend through the casing wall (if present), cement used to hold the casing in place (if present) and the wellbore wall.

For example, pumping the fracturing fluid into the formation at a pressure above the fracture gradient of the formation in accordance with the disclosed method can form one or more primary fractures in the formation. For example, pumping the fracturing fluid into the formation at a pressure above the fracture gradient of the formation in accordance with the disclosed method can also form a fracture network in the formation that includes at least one primary fracture and at least one microfracture. Primary proppant particulates are typically only placed in the primary fracture.

As used herein and in the appended claims, "forming a fracture network in the formation" means forming a new fracture network or expanding an existing fracture network in some dimension in the formation. The fracture network can include primary fractures, branches of primary fractures, and microfractures, whether induced by the fracturing treatment or naturally occurring. The fracture network is formed within the formation and is in fluid communication with the wellbore. For example, the fracture network is typically formed in a zone of the formation that surrounds the wellbore and propagates from at least one access conduit outwardly from the wellbore. Microfractures tend to extend outwardly from the tip and edges of primary fractures and primary fracture branches in a branching tree-like manner. The microfractures can extend transversely to the trajectories of the primary fractures and primary fracture branches, allowing the primary fractures and primary fracture branches to reach and link natural fractures both in and adjacent to the trajectories of the primary fractures and primary fracture branches.

As used herein and in the appended claims, the term "primary fracture" means a fracture that extends from the wellbore and is of a size sufficient to allow primary proppant particulates to be placed therein. The term "microfracture" means a natural fracture existing in the formation, or an induced secondary or tertiary fracture, that extends from a primary fracture or a primary fracture branch and is not of a size sufficient to allow primary proppant particulates to be placed therein. Microfractures can exist and be formed in both near-wellbore and far-field regions of the zone. As a result, the microfractures can give more depth and breadth to the fracture network resulting in increased production of hydrocarbons when the well is produced. For example, the disclosed method may be used in connection with a subterranean formation and wellbore having an existing fracture network.

For example, a pad fracturing fluid can first be pumped into the formation in accordance with the disclosed method. At some point, the pad fracturing fluid can be transitioned to the proppant slurry without ceasing the pumping process or otherwise reducing the hydraulic pressure placed on the formation by the fracturing treatment. As known to those skilled in the art with the benefit of this disclosure, if needed or desired, a pill can be pumped into the formation following pumping of the pad fracturing fluid and prior to pumping of the proppant slurry in order to allow the transition from the pad fracturing fluid to the proppant slurry to be made.

The proppant particulates can be placed in the fracture in any manner known to those skilled in the art with the benefit of this disclosure. For example, proppant particulates can be placed in the fracture in accordance with the disclosed method by pumping the fracturing fluid into the formation for a sufficient time and at a sufficient pressure to cause the proppant particulates to be placed in the fracture. The hydraulic pressure placed on the formation forces the fracturing fluid and proppant particulates into the fracture. When the pressure is released on the fracturing fluid, the proppant particulates remain in the fracture. While in place, the proppant particulates hold the fracture open, thereby maintaining the ability for fluid to flow through the fracture to the wellbore.

As used herein and in the appended claims, the terms "primary proppant particulate" and "conventional proppant particulate" are used interchangeably and mean a proppant particulate having a D50 particle size distribution of equal to or greater than 100 microns. For example, the primary proppant particulates used in the disclosed method can have a D50 particle size distribution of in the range of from 100 microns to about 1200 microns, or any subset therebetween. For example, the primary proppant particulates used in the disclosed method have a D50 particle size distribution of in the range of from about 150 microns to about 750 microns, or any subset therebetween. For example, the primary proppant particulates used in the disclosed method have a D50 particle size distribution of in the range of from about 175 microns to about 400 microns, or any subset therebetween. Apart from the above definition of primary proppant particulates, the modifier "primary" should not be construed as limiting in any way.

As used herein and in the appended claims, the term "micro-proppant particulate" means a particulate having a D50 particle size distribution of less than 100 microns. For example, the micro-proppant particulates used in the disclosed method have a D50 particle size distribution of in the range of from about 1 micron to about 99 microns, or any subset therebetween. For example, the micro-proppant particulates used in the disclosed method have a D50 particle size distribution of in the range of from about 5 microns to about 75 microns, or any subset therebetween. For example, the micro-proppant particulates used in the disclosed method have a D50 particle size distribution of in the range of from about 5 microns to about 50 microns, or any subset therebetween.

As used herein and in the appended claims, the "D50 particle size distribution" of a particulate means the value of the particle diameter at 50% in the cumulative distribution. The size of the proppant particulates can be selected based on the size of the fractures and other factors known to those skilled in the art with the benefit of this disclosure.

Any type of primary proppant particulate known to those skilled in the art to be suitable for use in propping open primary fractures in subterranean formations can be included in the fracturing fluid. Suitable primary proppant particulates include all shapes of materials, including substantially spherical materials, low to high aspect ratio materials, fibrous materials, polygonal materials (such as cubic materials), and mixtures thereof. For example, suitable primary proppant particulates can be selected from the group of sand, walnut hulls, resin pre-coated proppant particulates, man-made proppant particulates, and mixtures thereof. For example, a suitable primary proppant particulate for use herein is natural sand.

For example, primary proppant particulates can be included in the fracturing fluid in accordance with the disclosed method in an amount in the range of from about 0.01 pound to about 6 pounds per gallon of the fracturing fluid. For example, the primary proppant particulates can be mixed with the fracturing fluid in an amount in the range of from about 0.01 pound to about 1 pound per gallon of the slurry. For example, primary proppant particulates can be mixed with the fracturing fluid in an amount in the range of from about 0.025 pound to about 0.1 pound per gallon of the slurry.

The micro-proppant particulates used in the disclosed method can be any type of micro-proppant particulates suitable for use in propping open microfractures in subterranean formations as known to those skilled in the art with the benefit of this disclosure. Suitable micro-proppant particulates include all shapes of materials, including substantially spherical materials, low to high aspect ratio materials, fibrous materials, polygonal materials (such as cubic materials), and mixtures thereof. For example, the types of proppant particulates typically used as primary proppant particulates can be used as micro-proppant particulates. For example, micro-proppant particulates can be delivered to the well site in slurry form. The micro-proppant particulates can also be generated in the fracturing fluid.

Examples of micro-proppant particulates that can be used include sand (for example natural sand), bauxite, ceramic proppant materials, glass materials, polymer materials, polytetrafluoroethylene materials, fly ash, silica flour, seed shell pieces, fruit pit pieces, composite particulates including wood composite particulates, nut shell pieces including walnut hulls (for example, ground walnut hulls), resin pre-coated proppant particulates such as resin pre-coated sand, man-made non-degradable proppant particulates, and mixtures thereof. Examples of man-made proppant particulates include bauxite, ceramics, and polymeric composite particulates. Suitable composite particulates include a binder and a filler material wherein suitable filler materials include silica, alumina, fumed carbon, carbon black, graphite, mica, titanium dioxide, meta-silicate, calcium silicate, kaolin, talc, zirconia, boron, fly ash, hollow glass microspheres, solid glass, and combinations thereof.

For example, the micro-proppant particulates can be selected from the group consisting of silica flour, glass beads, fly ash, ceramics, bauxite, polymer materials, polymeric composites, mica, and combinations thereof. For example, the micro-proppant particulates can be selected from the group consisting of silica flour, fly ash, ceramics, polymeric composites and combinations thereof. Examples of commercially available micro-proppant particulates that can be used in the disclosed method include micro-proppant particulates manufactured by Zeeospheres Ceramics, LLC and sold as "Zeeospheres™ N-200" and "Zeeospheres™ N-600."

For example, micro-proppant particulates can be included in the fracturing fluid in accordance with the disclosed method in an amount at least sufficient to place micro-proppant particulates in a microfracture. For example, the micro-proppant particulates can be mixed with the fracturing fluid in accordance with the disclosed method in an amount in the range of from about 0.01 pound to about 2 pounds per 1000 gallons of the fracturing fluid. For example, the micro-proppant particulates can be mixed with the fracturing fluid in an amount in the range of from about 0.05 pound to about 1.0 pound per 1000 gallons of the fracturing fluid. For example, the micro-proppant particulates can be mixed with the fracturing fluid in an amount in the range of from about 0.1 pound to about 0.5 pound per 1000 gallons of the fracturing fluid.

Ceasing pumping of the proppant slurry into the subterranean formation in accordance with the disclosed method causes the pressure at which the proppant slurry is pumped into the formation to fall below the fracture gradient of the formation. For example, once pumping of the proppant slurry into the formation is ceased, or the pressure in the formation is otherwise caused to fall below the fracture gradient of the formation, the fracture(s) in the formation tend to close on top of the proppant particulates therein. The conductive channels formed by the proppant particulates allow hydrocarbons to flow through the fracture network to the wellbore and ultimately to the surface where they can be recovered.

In accordance with the disclosed method, when pumping of the fracturing fluid into the formation is ceased or the pressure at which the fracturing fluid is pumped into the formation is otherwise allowed to fall below the fracture gradient of the formation, the fracture formed in the formation may tend to close. However, the proppant particulates prevent the fracture from fully closing or otherwise provide conductive fluid pathways through the fracture. The resulting propped fracture provides one or more conductive channels through which fluids in the formation can flow toward the wellbore. As used herein and in the appended claims, unless stated otherwise, the term "fracture" includes and encompasses primary fractures and microfractures.

For example, when the treating agent of the fracturing fluid used in the fracturing method functions as a scale inhibitor, it can be used in an amount sufficient to inhibit the formation of scale on surfaces of access conduits, production tubing and equipment associated with producing the well. The treating agent can be placed by the fracturing fluid in the reservoir matrix for subsequently mixing with produced fluids. For example, water moving through the reservoir toward the wellbore during production will then dissolve a sufficient amount of the scale inhibitor to inhibit scale formation on the surfaces of the access conduit, production tubing and equipment associated with producing the well.

For example, when the fracturing fluid further comprises a gelling agent present in an amount sufficient to form a gel and increase the viscosity of the fracturing fluid, the treating agent of the fracturing fluid can function as a gel stabilizer and be present in an amount sufficient to stabilize the gel at a higher temperature than the temperature at which the gel would be stable without the treating agent. The gel increases the viscosity of the fracturing fluid, which makes it easier, for example, to fracture the formation and helps suspend and prevent settling of proppant particulates in the fracturing fluid. The treating agent allows the viscosity to be maintained even at the higher temperature. By fracturing the well, the productivity of the well can be improved.

In another embodiment, the method disclosed herein is a method of acidizing a well. For example, the method can be used to treat a well by matrix acidizing. In this embodiment, the well treatment fluid is an acidizing fluid that further comprises at least one acid (for example, an acid blend is often used). The type(s) of acid used will depend, for example, on the type of formation being acidized. For example, hydrochloric acid (HCl) is often used to matrix acidize a carbonate formation.

The method of this embodiment comprises providing the acidizing fluid, and pumping the acidizing fluid though the wellbore into the formation to acidize the formation. The formation is acidized in accordance with the method disclosed herein as known to those skilled in the art with the benefit of this disclosure. For example, in this embodiment, the treating agent can function to inhibit the formation of scale on surfaces of access conduits, production tubing and equipment associated with producing the well. The treating agent can be placed by the acidizing fluid in the reservoir matrix for subsequently mixing with produced fluids. For example, water moving through the reservoir toward the wellbore during production will then dissolve a sufficient amount of the scale inhibitor to inhibit scale formation on the surfaces of the access conduit, production tubing and equipment associated with producing the well.

In another embodiment, the method disclosed herein is a method of forming a gravel pack in a well. For example, the gravel pack can be installed proximate to an unconsolidated or loosely consolidated production interval in order to mitigate the production of particulate material such as sand with hydrocarbons from the well.

In this embodiment, the well treatment fluid is a gravel packing fluid that further comprises gravel. As used herein and in the appended claims, the term "gravel" means and includes any type of particulate material that can be used to form the particulate screen of a gravel pack. Examples of gravel that can be included in the well treatment fluid disclosed herein include silica particulate materials (for example, sand), ceramic proppant particulates with and without a resin coating, alumina particulate materials, polymer particulate materials including synthetic polymer particulate materials, metal oxide particulate materials and other materials used as proppant particulate materials. For example, the gravel can be large grain sand. For example, the gravel can have a D50 particle size distribution in the range of from about 50 microns to about 5 millimeters. For example, the gravel can have a D50 particle size distribution in the range of from about 100 microns to about 2 millimeters. The type and size of the gravel can be selected based on the type and size of the particulate material to be screened by the proppant pack and other factors known to those skilled in the art with the benefit of this disclosure.

The method of forming a gravel pack in a well comprises: providing the gravel packing fluid; pumping the gravel packing fluid into the well; placing gravel around a sand control screen to form a gravel pack proximate to a production interval that contains particulate material; and ceasing pumping of the gravel pack slurry into the wellbore. If a sand control screen is not already in place, the method can further comprise the step of, prior to placing gravel around a sand control screen, placing a sand control screen proximate to the production interval that contains particulate material.

As used herein and in the appended claims, a "sand control screen" means a screen, slotted liner or other type of apparatus or structure that can be used to form a gravel pack in a well. A "production interval" means a formation or a zone or interval thereof that contains hydrocarbons to be produced by the well. "Proximate to" means adjacent to, near, or in the production interval. A particulate material means sand or another type of particulate material.

The sand control screen can be placed proximate to the production interval by any method known to those skilled in the art with the benefit of this disclosure. For example, the sand control screen can be lowered into the wellbore on a work string and placed in the desired position. For example, the sand control screen can be formed of metal or steel.

The gravel pack slurry can be provided, for example, by mixing the components of the gravel packing fluid together at the site of the well as known to those skilled in the art with the benefit of this disclosure. For example, the gravel can be included in the fracturing fluid in an amount at least sufficient to form a gravel pack in the well.

The gravel packing fluid can be pumped into the well in any manner known to those skilled in the art with the benefit of this disclosure. For example, the gravel packing can be pumped into the well using one or more pumps. The gravel packing fluid is pumped through the wellbore and through one or more access conduits into the formation.

Gravel can be placed around the sand control screen to form a gravel pack proximate to the production interval by pumping the gravel packing fluid into the well (for example, down the work string) and into the well annulus formed between the sand control screen and the perforated well casing (if the well is cased) or open hole production zone (if the well is not cased). For example, the base fluid either flows into the formation or returns to the surface by flowing through the sand control screen or both. In either case, the gravel is deposited concentrically around the sand control screen to form a gravel pack. For example, the gravel pack is highly permeable to the flow of hydrocarbon fluids but blocks the flow of the particulate material carried by hydrocarbon fluids to be produced from the production interval.

For example, when the treating agent of the gravel packing fluid used in the gravel packing method functions as a scale inhibitor, it can be used in an amount sufficient to inhibit the formation of scale on surfaces of access conduits, production tubing and equipment associated with producing the well. The treating agent can be placed by the gravel packing fluid in the reservoir matrix for subsequently mixing with produced fluids. For example, water moving through the reservoir toward the wellbore during production will then dissolve a sufficient amount of the scale inhibitor to inhibit scale formation on the surfaces of the access conduit, production tubing and equipment associated with producing the well.

For example, when the gravel packing fluid further comprises a gelling agent present in an amount sufficient to form a gel and increase the viscosity of the well treatment fluid, the treating agent of the gravel packing fluid can function as a gel stabilizer and be present in an amount sufficient to stabilize the gel at a higher temperature than the temperature at which the gel would be stable without the treating agent. The gel increases the viscosity of the gravel packing fluid, which makes it easier, for example, to suspend and prevent settling of the gravel in the gravel packing fluid. The treating agent allows the viscosity to be maintained even at the higher temperature.

The Aqueous-Based Well Treatment Fluid

The aqueous-based well treatment fluid disclosed herein is the well treatment fluid used in the method disclosed herein as described above.

For example, in one embodiment, the aqueous-based well treatment fluid disclosed herein is an aqueous-based drilling fluid for use in drilling wells into a subterranean formation. In addition to the aqueous base fluid and gelling agent, the drilling fluid can include, for example, one or more weighting materials, fluid loss control additives, bridging materials, lubricants, corrosion inhibitors and/or suspending agents.

For example, in another embodiment, the aqueous-based well treatment fluid disclosed herein is an aqueous-based stimulation fluid. For example, the well treatment fluid can be an acidizing fluid, and further comprise one or more acid compounds. For example, the well treatment fluid disclosed herein can be used to acidize sandstone and carbonate formations. For example, the well treatment fluid can be a fracturing fluid that comprises a plurality of proppant particulates.

For example, in another embodiment, the aqueous-based well treatment fluid disclosed herein is an aqueous-based gravel packing fluid, and further comprises gravel.

Figure 2:
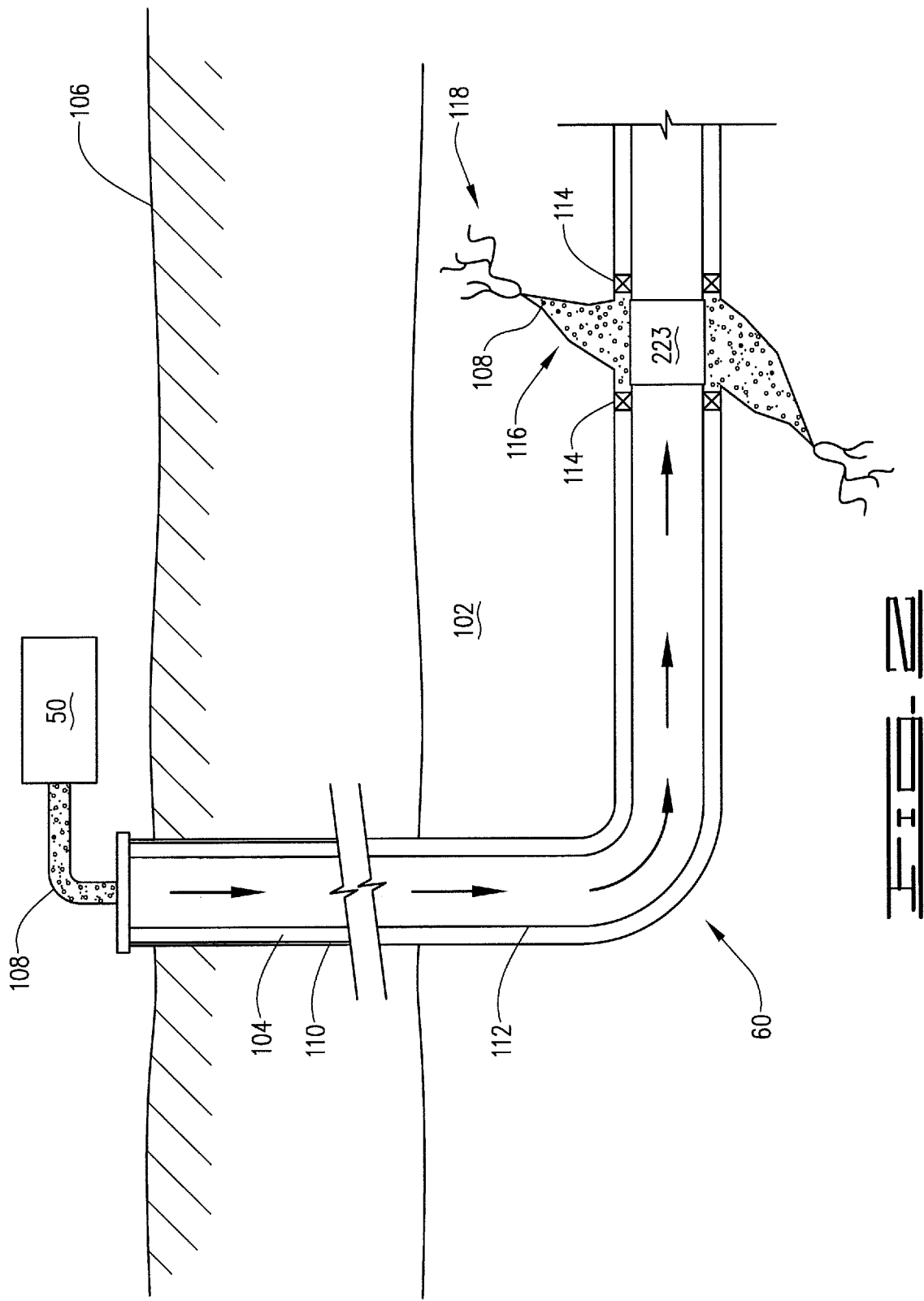
FIG. 2 is a diagram illustrating an example of a subterranean formation in which a fracturing operation can be performed in accordance with certain embodiments of the present disclosure.

The exemplary fluids, compositions and methods disclosed herein may directly or indirectly affect one or more components or pieces of equipment associated with the preparation, delivery, recapture, recycling, reuse, and/or disposal of the disclosed fluids, compositions and methods. FIGS. 1 and 2 illustrate a typical fracturing operation.

For example, and with reference to FIG. 1, the disclosed fluids, compositions and methods may directly or indirectly affect one or more components or pieces of equipment associated with an exemplary fracturing system 10, according to one or more embodiments. In certain instances, the system 10 includes a fracturing fluid producing apparatus 20 (for example, for producing a pad fracturing fluid and/or proppant slurry for use in the disclosed method), a fluid source 30, a proppant source 40, and a pump and blender system 50. The system 10 resides at the surface at a well site where a well 60 is located. For example, the fracturing fluid producing apparatus 20 can combine a gel precursor with fluid (e.g., liquid or substantially liquid) from fluid source 30, to produce a hydrated fracturing fluid (for example, the pad fluid and/or proppant slurry of the method disclosed herein) that is used to fracture the formation. The hydrated fracturing fluid can be a fluid for ready use in a fracture stimulation treatment of the well 60 or a concentrate to which additional fluid is added prior to use in a fracture stimulation of the well 60. In other instances, the fracturing fluid producing apparatus 20 can be omitted and the fracturing fluid sourced directly from the fluid source 30. In certain instances, as discussed above, the fracturing fluid may comprise water, a hydrocarbon fluid, a polymer gel, foam, air, wet gases and/or other fluids.

The proppant source 40 can include and provide the proppant (including the micro-proppant particulates and primary proppant particulates of the disclosed method) for combination with the fracturing fluid (for example, the pad fluid and proppant slurry) as appropriate. The system may also include an additive source 70 that can provide the degradable metal alloy milling waste particulates of the disclosed well treatment fluid and one or more additives (e.g., gelling agents, weighting agents, and/or other optional additives as discussed above) to alter the properties of the fracturing fluid (for example, the pad fluid and/or proppant slurry). For example, additives from the additive source 70 can be included to reduce pumping friction, to reduce or eliminate the fluid's reaction to the geological formation in which the well is formed, to operate as surfactants, and/or to serve other functions.

For example, the pump and blender system 50 can receive the fracturing fluid (for example, the base carrier fluid) and combine it with other components, including proppant particulates from the proppant source 40 and/or additional fluid and other additives from the additive source 70. The resulting mixture may be pumped down the well 60 under a pressure sufficient to create or enhance one or more fractures in a subterranean zone, for example, to stimulate production of fluids from the zone. Notably, in certain instances, the fracturing fluid producing apparatus 20, fluid source 30, proppant source 40 and/or additive source 70 may be equipped with one or more metering devices (not shown) to control the flow of fluids, degradable metal alloy milling waste particulates, proppant particulates, and/or other compositions to the pump and blender system 50. Such metering devices may permit the pump and blender system 50 to source from one, some, or all of the different sources at a given time, and may facilitate the preparation of fracturing fluids in accordance with the present disclosure using continuous mixing or "on the fly" methods. Thus, for example, the pump and blender system 50 can provide just fracturing fluid (for example, the pad fluid) into the well at some times, just proppant slurry at some times, just proppant particulates at other times, and combinations of those components at yet other times.

FIG. 2 shows the well 60 during a fracturing operation in a portion of a subterranean formation of interest 102 (for example, a subterranean zone) surrounding a wellbore 104. For example, the formation of interest can include one or more subterranean formations or a portion of a subterranean formation.

The wellbore 104 extends from the surface 106, and the fracturing fluid 108 (for example, the pad fluid and proppant slurry) is applied to a portion of the subterranean formation 102 surrounding the horizontal portion of the wellbore. Although shown as vertical deviating to horizontal, the wellbore 104 may include horizontal, vertical, slanted, curved, and other types of wellbore geometries and orientations, and the fracturing treatment may be applied to a subterranean zone surrounding any portion of the wellbore. The wellbore 104 can include a casing 110 that is cemented or otherwise secured to the wellbore wall. The wellbore 104 can be uncased or include uncased sections. Perforations can be formed in the casing 110 to allow fracturing fluids and/or other materials to flow into the subterranean formation 102. In cased wells, perforations can be formed using shaped charges, a perforating gun, hydro-jetting and/or other tools.

The well is shown with a work string 112 depending from the surface 106 into the wellbore 104. The pump and blender system 50 is coupled to a work string 112 to pump the fracturing fluid 108 into the wellbore 104. The work string 112 may include coiled tubing, jointed pipe, and/or other structures that allow fluid to flow into the wellbore 104. The work string 112 can include flow control devices, bypass valves, ports, and/or other tools or well devices that control a flow of fluid from the interior of the work string 112 into the subterranean zone 102. For example, the work string 112 may include ports adjacent the wellbore wall to communicate the fracturing fluid 108 directly into the subterranean formation 102, and/or the work string 112 may include ports that are spaced apart from the wellbore wall to communicate the fracturing fluid 108 into an annulus in the wellbore between the work string 112 and the wellbore wall.

The work string 112 and/or the wellbore 104 may include one or more sets of packers 114 that seal the annulus between the work string 112 and wellbore 104 to define an interval of the wellbore 104 into which the fracturing fluid 108 will be pumped. FIG. 4 shows two packers 114, one defining an uphole boundary of the interval and one defining the downhole end of the interval.

When the fracturing fluid 108 (for example, the pad fracturing fluid) is introduced into wellbore 104 (e.g., in FIG. 4, the area of the wellbore 104 between packers 114) at a sufficient hydraulic pressure, one or more primary fractures 116 and microfractures 118 are created in the subterranean zone 102. As shown, the microfractures have propagated from or near the ends and edges of the primary fractures 116. The primary proppant particulates in the fracturing fluid 108 (for example, the proppant slurry) enter the fractures 116 where they may remain after the fracturing fluid flows out of the wellbore, as described above. These primary proppant particulates may "prop" fractures 116 such that fluids may flow more freely through the fractures 116. Similarly, the micro-proppant particulates in the fracturing fluid 108 (for example, the pad fluid and the proppant slurry) enter the fractures 118 where they may remain after the fracturing fluid flows out of the wellbore, as described above. The primary proppant particulates and micro-proppant particulates "prop" fractures 116 and 118, respectively, such that fluids may flow more freely through the fractures 116 and 118.

While not specifically illustrated herein, the disclosed fluids, compositions and methods may also directly or indirectly affect any transport or delivery equipment used to convey the compositions to the fracturing system 10 such as, for example, any transport vessels, conduits, pipelines, trucks, tubulars, and/or pipes used to fluidically move the compositions from one location to another, any pumps, compressors, or motors used to drive the compositions into motion, any valves or related joints used to regulate the pressure or flow rate of the compositions, and any sensors (i.e., pressure and temperature), gauges, and/or combinations thereof, and the like.

EXAMPLES

The following examples illustrate specific embodiments consistent with the present disclosure but do not limit the scope of the disclosure or the appended claims. Concentrations and percentages are by weight unless otherwise indicated.

Example I

Fulvic acid was tested as a gel stabilizer for a gel formed using a diutan gelling agent.

A brine base fluid was prepared by combining sodium bromide with fresh water. The sodium bromide was present in the base fluid in an amount of 9.6 pounds per gallon of the fresh water. The gelling agent used in the tests was a diutan gelling agent available from Halliburton Energy Services, Inc. in association with the trade name WG-38™ gelling agent.

Two test fluids were prepared, Test Fluid A and Test Fluid B. Test Fluid A was prepared by mixing the gelling agent with the brine base fluid in an amount of 80 pounds per 1000 gallons of the base fluid. Test Fluid B was prepared in the same manner, except that fulvic acid was also combined with the brine base fluid in an amount of 40 pounds per 1000 gallons of the base fluid.

Proppant Settling Test

First, Test Fluid A was placed in an elongated 100 milliliter beaker and agitated to form a gel therein. A 30/50 low density ceramic proppant (a ceramic proppant having a sieve size between 30 and 50) (CARBOECONOPROP®) sold by Carbo Ceramics Inc.) was then mixed into the test fluid in an amount of 4 pounds per gallon of the base fluid. Test Fluid A was then heated to 300° F. and maintained at 300° F. for approximately one hour.

After the one hour test period, it was observed that approximately 10% of the proppant had settled in Test Fluid A.

Next, Test Fluid B was placed in an elongated 100 milliliter beaker and agitated to form a gel therein. A 30/50 low density ceramic proppant (CARBOECONOPROP®) sold by Carbo Ceramics Inc.) was then mixed into the test fluid in an amount of 4 pounds per gallon of the base fluid. Test Fluid B was then heated to 310° F. and maintained at 310° F. for approximately one hour.

After the one hour test period, it was observed that none of the proppant particulates had settled in Test Fluid B. Thus, a diutan gel stabilized with fulvic acid can hold proppant effectively at 310° F. for at least one hour. The gel stabilized with fulvic acid had a very good thermal stability, even in a high density brine.

Rheology Tests

Tests were conducted to better understand the rheological properties associated with a gel stabilized by fulvic acid.

The viscosity profiles of Test Fluid A and Test Fluid B as described above were determined. The results of the tests are shown by FIG. 3 herein.

Figure 3:
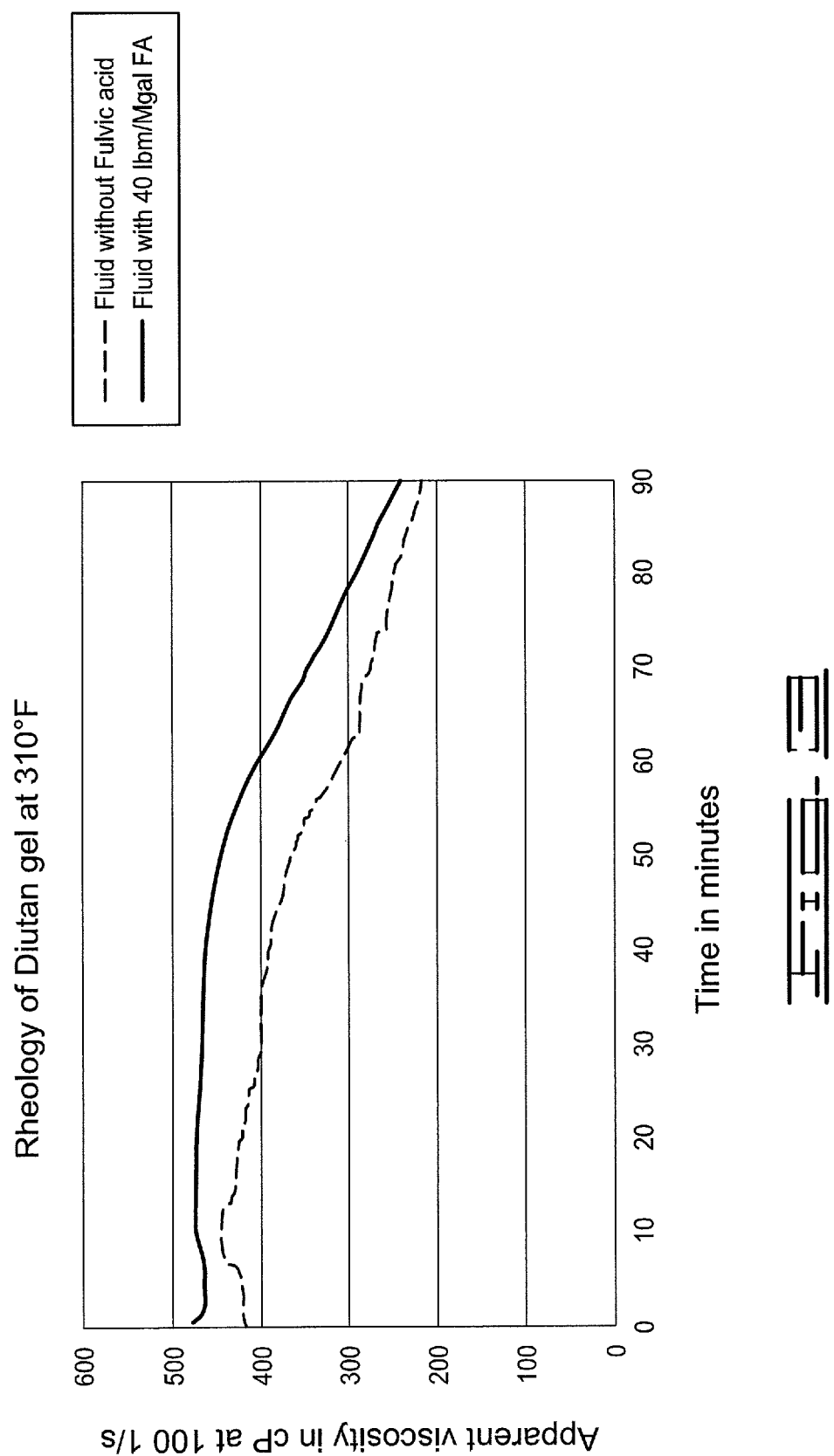
FIG. 3 is a graph corresponding to Example 1 and illustrating the rheological behavior of diutan gel at 310° F. and 100 s$^{-1}$.

As shown by FIG. 3, no significant viscosity rise was observed with Test Fluid B, as compared to Test Fluid A. Thus, fulvic acid can effectively stabilize a polymer gel without significantly increasing its viscosity. This allows the well treatment fluid to be pumped into the formation at essentially the same pressure that would be required without a gel stabilizer.

Breaking the Gel

Next, a breaker including acetic acid and acetic acid anhydrate was combined with Test Fluid B in a beaker. The mixture was heated to approximately 200° F. After a few minutes, it was observed that the mixture had turned into a clear, brown liquid, indicating that the gel had cleanly broken.

Example II

Next, fulvic acid was tested as a scale inhibitor in a seawater-based well treatment fluid. The seawater used in the tests was Angola seawater.

Two test fluids were prepared, Test Fluid A and Test Fluid B. Test Fluid A was prepared by placing 200 milliliter of Angola seawater in a beaker and adding a sufficient amount of sodium hydroxide thereto to raise the pH of the seawater to approximately 10. Test Fluid B was prepared in the same manner, except that 2 grams of fulvic acid were added to the beaker and mixed into the seawater.

Each test fluid was heated in a water bath to 190° F. and maintained at 190° F. for approximately 24 hours. After the 24 hour test period, it was observed that significant scale had precipitated out of the seawater in Test Fluid A. The scale settled to the bottom of the beaker and was in the form of a white powder. On the other hand, after the 24 hour test period, no scale formation was observed in Test Fluid B.

Therefore, the present compositions and methods are well adapted to attain the ends and advantages mentioned, as well as those that are inherent therein. The particular example disclosed above is illustrative only, as the present treatment additives and methods may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative examples disclosed above may be altered or modified, and all such variations are considered within the scope and spirit of the present treatment additives and methods. While compositions and methods are described in terms of "comprising," "containing," "having," or "including" various components or steps, the compositions and methods can also, in some examples, "consist essentially of" or "consist of" the various components and steps. Whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee.

What is claimed is:

1. A method of treating a well, comprising:
introducing an aqueous-based well treatment fluid into a portion of the well having a well temperature above 200° F. and treating the portion of the well with the well treatment fluid, said well treatment fluid including:
an aqueous base fluid;
a diutan gelling agent; and
a treating agent, wherein said treating agent comprises fulvic acid, wherein:
said diutan gelling agent is present in said well treatment fluid in an amount sufficient to form a gel and increase the viscosity of said well treatment fluid,
said treating agent functions as a scale inhibitor and is present in said well treatment fluid in an amount sufficient to inhibit the formation of scale on at least one surface associated with the well, and
said treating agent functions as a gel stabilizer and is present in said well treatment fluid in an amount sufficient to stabilize said gel at said well temperature above 200° F.

2. The method of claim 1, wherein said treating agent consists of fulvic acid.

3. The method of claim 1, wherein said treating agent is present in said well treatment fluid in an amount in the range of from about 0.1 pound per 1000 gallons to about 1000 pounds per 1000 gallons of the aqueous base fluid.

4. The method of claim 1, wherein said treating agent functions so as to stabilize said gel such that said gel is stable for at least one hour at said well temperature.

5. The method of claim 1, wherein said well temperature is from about 275° F. to about 310° F. and said treating agent functions so as to stabilize said gel such that said gel is stable for at least one hour at said well temperature.

6. The method of claim 5, wherein said treating agent is present in said well treatment fluid in an amount in the range of from about 0.1 pound per 1000 gallons to about 1000 pounds per 1000 gallons of the aqueous base fluid.

7. The method of claim 5, wherein said treating agent is present in said well treatment fluid in an amount in the range of from about 1 pound per 1000 gallons to about 300 pounds per 1000 gallons of said aqueous base fluid.

8. The method of claim 5, wherein said well treatment fluid further comprise a gel breaker.

9. A method of fracturing a subterranean formation, wherein said subterranean formation is at a formation temperature above 200° F., comprising:
   providing a fracturing fluid, said fracturing fluid including:
      an aqueous base fluid;
      a diutan gelling agent;
      a treating agent, wherein said treating agent comprises fulvic acid; and
      a plurality of proppant particulates, wherein:
         said diutan gelling agent is present in said fracturing fluid in an amount sufficient to form a gel and increase the viscosity of said fracturing fluid,
         said treating agent functions as a scale inhibitor and is present in said fracturing fluid in an amount sufficient to inhibit the formation of scale on at least one surface, and
         said treating agent functions as a gel stabilizer and is present in said fracturing fluid in an amount sufficient to stabilize said gel at said well temperature;
   pumping said fracturing fluid through the wellbore into the formation at a pressure above the fracture gradient of the formation to form a fracture in the formation;
   placing proppant particulates in the fracture; and
   ceasing pumping of the fracturing fluid into the formation.

10. The method of claim 9, wherein said treating agent consists of fulvic acid.

11. The method of claim 9, wherein said treating agent is present in said fracturing fluid in an amount in the range of from about 0.1 pound per 1000 gallons to about 1000 pounds per 1000 gallons of the aqueous base fluid.

12. The method of claim 9, wherein said treating agent functions so as to stabilize said gel such that said gel is stable for at least one hour at the formation temperature.

13. The method of claim 9, wherein said formation temperature is from about 275° F. to about 310° F. and said treating agent functions so as to stabilize said gel such that said gel is stable for at least one hour at said formation temperature.

14. The method of claim 13, wherein said treating agent is present in said fracturing fluid in an amount in the range of from about 1 pound per 1000 gallons to about 300 pounds per 1000 gallons of said aqueous base fluid.

15. A method of forming a gravel pack in a well at a well temperature above 200° F., comprising:
   providing a gravel packing fluid, the gravel packing fluid including:
      an aqueous base fluid;
      a diutan gelling agent;
      a treating agent, wherein said treating agent comprises fulvic acid; and
      gravel, wherein:
         said diutan gelling agent is present in said gravel packing fluid in an amount sufficient to form a gel and increase the viscosity of said gravel packing fluid,
         said treating agent functions as a scale inhibitor and is present in said gravel packing fluid in an amount sufficient to inhibit the formation of scale on at least one surface, and
         said treating agent functions as a gel stabilizer and is present in said gravel packing fluid in an amount sufficient to stabilize said gel at said well temperature;
   pumping the gravel packing fluid into the well;
   placing gravel around a sand control screen to form a gravel pack proximate to a production interval that contains particulate material; and
   ceasing pumping of said gravel packing fluid into said wellbore.

16. The method of claim 15, wherein said treating agent consists of fulvic acid.

17. The method of claim 15, further comprising the step of, prior to placing gravel around a sand control screen, placing a sand control screen proximate to the production interval that contains particulate material.

18. The method of claim 15, wherein said treating agent is present in said gravel packing fluid in an amount in the range of from about 0.1 pound per 1000 gallons to about 1000 pounds per 1000 gallons of the aqueous base fluid.

19. The method of claim 15, wherein said treating agent functions so as to stabilize said gel such that said gel is stable for at least one hour at the well temperature.

20. The method of claim 15, wherein said well temperature is from about 275° F. to about 310° F. and said treating agent functions so as to stabilize said gel such that said gel is stable for at least one hour at said well temperature.

21. The method of claim 15 wherein the gravel packing fluid is pumped into said well using one or more pumps.

* * * * *